US009333714B2

(12) United States Patent
Tunis, III et al.

(10) Patent No.: US 9,333,714 B2
(45) Date of Patent: May 10, 2016

(54) VEHICULAR ARMOR SYSTEM

(71) Applicants: Hardwire, LLC, Pocomoke City, MD (US); George C. Tunis, III, Ocean City, MD (US)

(72) Inventors: George C. Tunis, III, Ocean City, MD (US); Scott Kendall, Ocean City, MD (US); Justin Tucker Gordon, Snow Hill, MD (US)

(73) Assignee: Hardwire, LLC, Pocomoke City, MD (US)

( * ) Notice: Subject to any disclaimer, the term of this patent is extended or adjusted under 35 U.S.C. 154(b) by 30 days.

(21) Appl. No.: 14/252,094

(22) Filed: Apr. 14, 2014

(65) Prior Publication Data

US 2015/0268009 A1    Sep. 24, 2015

Related U.S. Application Data

(63) Continuation-in-part of application No. 14/208,092, filed on Mar. 13, 2014, now Pat. No. 8,991,118.

(60) Provisional application No. 61/787,495, filed on Mar. 15, 2013.

(51) Int. Cl.
*E06B 3/26* (2006.01)
*B29C 70/46* (2006.01)
(Continued)

(52) U.S. Cl.
CPC .............. *B29C 70/465* (2013.01); *B43L 1/00* (2013.01); *B43L 1/008* (2013.01); *E05G 1/024* (2013.01); *E05G 1/026* (2013.01); *F41H 5/013* (2013.01); *F41H 5/0471* (2013.01); *F41H 5/226* (2013.01); *F41H 7/048* (2013.01); *B29K 2067/003* (2013.01); *B29K 2105/08* (2013.01); *B29L 2031/3005* (2013.01); *B29L 2031/768* (2013.01);
(Continued)

(58) Field of Classification Search
CPC ......... F41H 7/044; F41H 5/08; F41H 5/0478; B29C 70/465; B29L 2031/768; B29L 2031/3005; B29K 2105/08; B29K 2067/003
USPC ........................................................ 52/202
See application file for complete search history.

(56) References Cited

U.S. PATENT DOCUMENTS

| 227,662 A | 5/1885 | Thompson |
| D23,933 S | 1/1895 | Odgers |

(Continued)

OTHER PUBLICATIONS

Armacell Engineered Foams, Ensolite®, Submittal Sheet (effective Jun. 8, 2007).
(Continued)

*Primary Examiner* — Mark Wendell
(74) *Attorney, Agent, or Firm* — Posternak Blankstein & Lund LLP

(57) ABSTRACT

A vehicular armor system to prevent ballistic projectiles from penetrating a vehicle includes a panel having a perimeter defining an area sized to cover at least a portion of an exterior vehicular surface, generally a door, and having a contour within the perimeter configured to generally conform to the portion of the vehicular surface. The panel includes a layered arrangement including a protection layer comprised of a ballistic material and an outer cosmetic layer on which color and/or graphic matter can be applied. The panel is mounted to the vehicle, such as with a removable magnetic mounting system. The panel can also be configured for use as a personal shield when removed from the vehicle. A method of manufacturing the armor system is also provided.

14 Claims, 11 Drawing Sheets

(51) Int. Cl.

| | |
|---|---|
| *B43L 1/00* | (2006.01) |
| *E05G 1/024* | (2006.01) |
| *E05G 1/026* | (2006.01) |
| *F41H 5/013* | (2006.01) |
| *F41H 5/04* | (2006.01) |
| *F41H 5/22* | (2006.01) |
| *F41H 7/04* | (2006.01) |
| *B29K 67/00* | (2006.01) |
| *B29K 105/08* | (2006.01) |
| *B29L 31/00* | (2006.01) |
| *B29L 31/30* | (2006.01) |
| *B32B 38/10* | (2006.01) |
| *B32B 37/12* | (2006.01) |

(52) U.S. Cl.
CPC .......... *B32B 37/12* (2013.01); *B32B 38/10* (2013.01); *B32B 2305/076* (2013.01); *B32B 2305/34* (2013.01); *B32B 2307/208* (2013.01); *B32B 2311/00* (2013.01); *B32B 2419/00* (2013.01); *B32B 2571/02* (2013.01); *B32B 2605/08* (2013.01)

(56) References Cited

U.S. PATENT DOCUMENTS

| | | |
|---|---|---|
| 634,922 A | 10/1899 | Waldrip |
| D42,068 S | 12/1911 | Stippich |
| D42,117 S | 1/1912 | Bardezbanian |
| 1,361,678 A | 12/1920 | Buck |
| D67,479 S | 6/1925 | Ward |
| 1,693,761 A | 12/1928 | Macripo |
| D132,127 S | 4/1942 | Jones |
| D164,008 S | 7/1951 | Loyd |
| D264,419 S | 5/1982 | Dorman et al. |
| D284,678 S | 7/1986 | Shamoon |
| 4,628,572 A | 12/1986 | Chang |
| 4,648,189 A | 3/1987 | Michel |
| D298,489 S | 11/1988 | Sornborger |
| 5,145,141 A | 9/1992 | Hunter |
| D343,865 S | 2/1994 | Pohl |
| 5,308,034 A | 5/1994 | Hunter |
| D354,087 S | 1/1995 | Dunlap et al. |
| 5,422,155 A | 6/1995 | Spence, Jr. |
| 5,516,151 A | 5/1996 | Mund et al. |
| 5,527,568 A | 6/1996 | Boone et al. |
| 5,599,187 A * | 2/1997 | Mesiano ............ F41B 11/00 124/56 |
| D396,065 S | 7/1998 | Johnson et al. |
| D429,994 S | 8/2000 | Ziegler |
| D435,066 S | 12/2000 | Hurschman |
| D443,655 S | 6/2001 | Chaikel et al. |
| 6,568,310 B2 * | 5/2003 | Morgan ............ F41H 5/0457 244/118.5 |
| D496,068 S | 9/2004 | Mandel |
| 6,899,009 B2 * | 5/2005 | Christiansen ......... E06B 9/00 89/36.02 |
| D506,074 S | 6/2005 | Chen et al. |
| D507,302 S | 7/2005 | Chen et al. |
| D522,255 S | 6/2006 | Bruce |
| D535,256 S | 1/2007 | Fort et al. |
| D558,270 S | 12/2007 | Beno |
| D562,589 S | 2/2008 | Mellon |
| D570,166 S | 6/2008 | Brownlee |
| 7,429,706 B2 | 9/2008 | Ho |
| D590,018 S | 4/2009 | Nash et al. |
| D604,053 S | 11/2009 | Liu et al. |
| 7,717,468 B2 | 5/2010 | Isaacs |
| D623,226 S | 9/2010 | Hoch et al. |
| D623,227 S | 9/2010 | Hoch et al. |
| D623,693 S | 9/2010 | Hoch et al. |
| 8,006,605 B2 | 8/2011 | Tunis et al. |
| D666,674 S | 9/2012 | Moore et al. |
| D677,257 S | 3/2013 | Andre et al. |
| D684,363 S | 6/2013 | Wanders |
| D687,100 S | 7/2013 | Tunis et al. |
| 8,739,675 B2 | 6/2014 | Tunis et al. |
| 2002/0180205 A1 | 12/2002 | Anderson |
| 2003/0080248 A1 | 5/2003 | Morgan |
| 2006/0097989 A1 | 5/2006 | Ho |
| 2007/0126224 A1 | 6/2007 | Isaacs |
| 2007/0180982 A1 * | 8/2007 | Dagher ............ F41H 5/013 89/36.02 |
| 2008/0271595 A1 * | 11/2008 | Bird ............ F41H 5/0414 89/36.02 |
| 2009/0301290 A1 * | 12/2009 | Adler ............ F41H 5/013 89/36.07 |
| 2010/0083819 A1 * | 4/2010 | Mann ............ A61K 39/00 89/36.02 |
| 2012/0090452 A1 | 4/2012 | Sudhakar |
| 2013/0276623 A1 * | 10/2013 | Moore ............ F41H 5/08 89/36.02 |
| 2013/0284003 A1 | 10/2013 | Dodworth |
| 2013/0302581 A1 | 11/2013 | Mannheim Astete et al. |

OTHER PUBLICATIONS

Armacell Engineered Foams, Ensolite® IV1, Automotive and Industrial Specifications, 2011.

Texcalibur Armor, Custom Armored Car Kits, available Mar. 13, 2014, www.cararmorkits.com/.

Texcalibur Armor, Armoring Process, available Mar. 13, 2014, texcaliburarmor.com/armoringprocess.html.

Texcalibur Armor, Armoring Materials, available Mar. 13, 2014, texcaliburarmor.com/armoringmaterials.html.

TAC (Texas Armoring Corporation), Bulletproof Car Armoring Manufacturing Process, available Mar. 13, 2014, texasarmoring.com/armored_vehicle_bulletproofing_process.html.

TAC (Texas Armoring Corporation), Bulletproof Car Materials for Armoring Manufacturing Process, available Mar. 13, 2014, texasarmoring.com/armored_vehicle_bulletproofing_materials.html.

TAC (Texas Armoring Corporation), Armored Cars & Bulletproof Vehicle Levels, available Mar. 13, 2014, texasarmoring.com/armoring_levels.html.

International Armoring Corporation, Bullet Proof Specifications of IAC, available Mar. 13, 2014, armormax.com/armored-cars-bulletproof-specs.html.

* cited by examiner

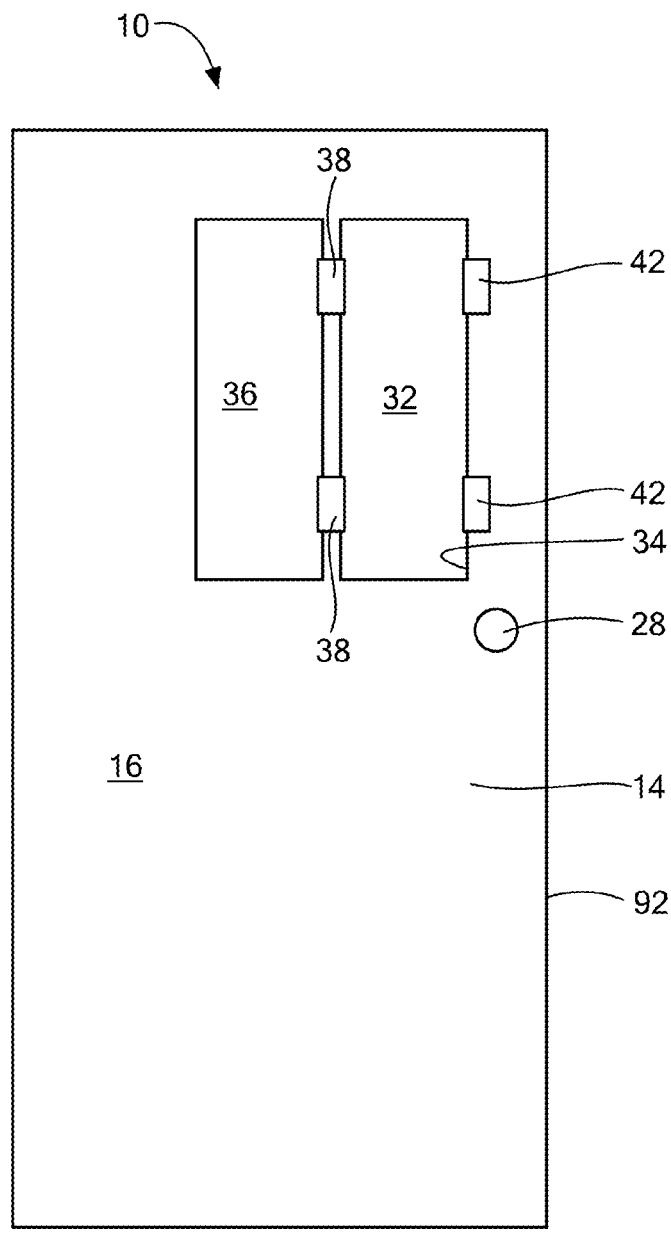
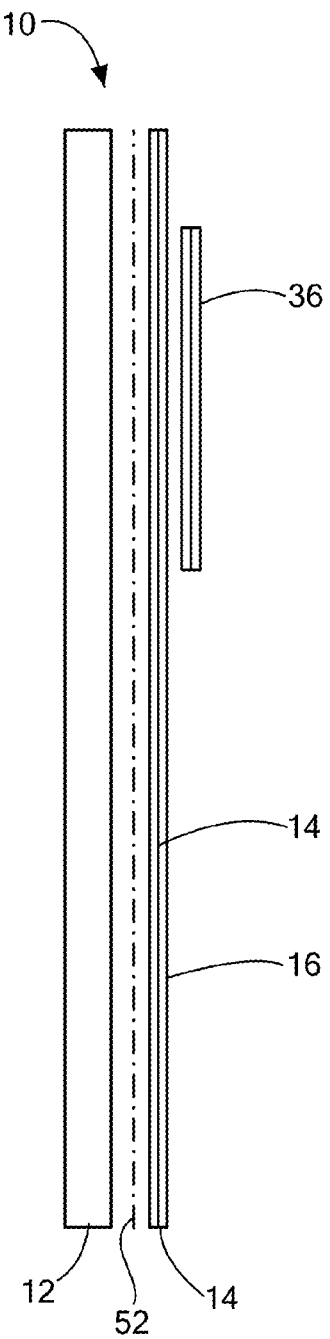
*FIG. 1*
*FIG. 2*

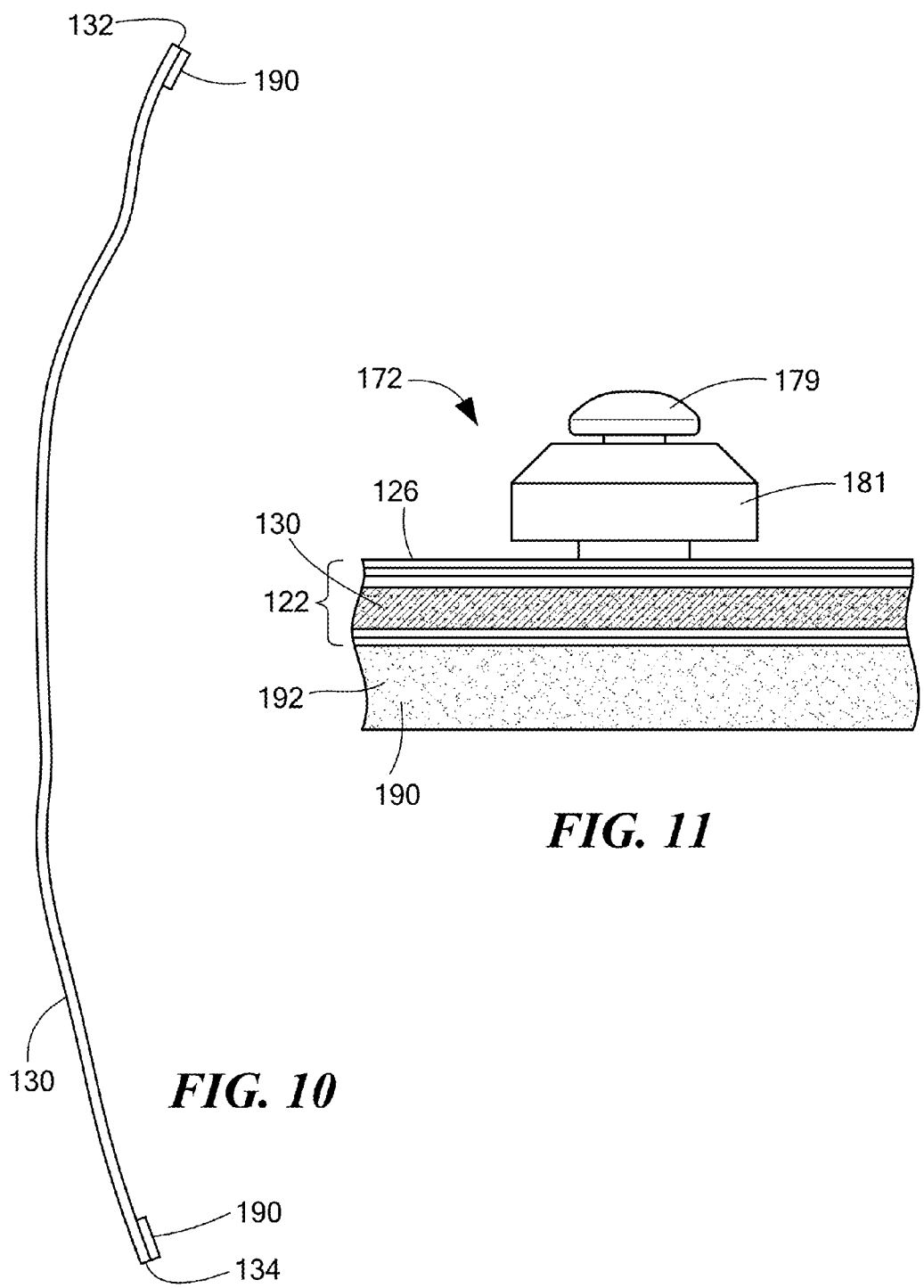

VEHICULAR ARMOR SYSTEM

CROSS REFERENCE TO RELATED APPLICATIONS

This application is related to U.S. Provisional Patent Application No. 61/753,177, filed on Jan. 16, 2013, U.S. Design Pat. application No. 29/446,050, filed on Feb. 20, 2013, U.S. Design Pat. application No. 29/446,070, filed on Feb. 20, 2013, and U.S. Design Pat. application No. 29/446,073, filed on Feb. 20, 2013, the disclosures of all of which are incorporated by reference herein.

This application is a continuation-in-part of and claims the benefit under 35 U.S.C. §120 of U.S. patent application Ser. No. 14/208,092, filed on Mar. 13, 2014, which claims the benefit under 35 U.S.C. §119(e) of U.S. Provisional Patent Application No. 61/787,495, filed on Mar. 15, 2013, the disclosures of which are incorporated by reference herein.

STATEMENT REGARDING FEDERALLY SPONSORED RESEARCH OR DEVELOPMENT

N/A

BACKGROUND OF THE INVENTION

Many automotive vehicles are routinely modified to provide ballistic protection to the occupants. These include law enforcement vehicles, diplomatic vehicles, celebrity or athlete transport, and any other vehicle requiring improved ballistic projectile resistance. These armor systems require extensive dismantling and modification of the vehicle and many hours in the shop for the modification, during which time the vehicle is out of service.

Similarly, high security doors are known that have steel layers incorporated into the door during manufacture and prior to installation. Retrofit security features for doors are often directed toward door jambs, locks, or latches for preventing doors from being easily broken in.

SUMMARY OF THE INVENTION

The present invention relates to a vehicular armor system that provides protection against ballistic projectiles fired at a vehicle, particularly a vehicle door. The armor system can be installed rapidly on the vehicle exterior, in a matter of seconds or minutes rather than hours required for other armor systems, and does not require dismantling of the vehicle. The armor system includes an outer cosmetic layer that can include color or a color pattern to blend in with the vehicle and therefore be less conspicuous. Additionally, the cosmetic layer can include graphic matter, including text and/or an image(s), for example, to identify a law enforcement agency.

More particularly, the armor system is in the form of a panel comprising a layered arrangement of materials. The panel comprises an inner surface, an outer surface, and a perimeter defining an area, the area sized to cover at least a portion of an exterior vehicular surface. The panel further comprises a contour within the perimeter configured to generally conform to a contour of the portion of the vehicular surface.

The layered arrangement of materials comprises a protection layer comprised of a ballistic material and the cosmetic layer. The protection layer includes an inner side disposed to face the vehicular surface and an outer side disposed to face outwardly from the vehicular surface. The cosmetic layer is arranged on the outer side of the protection layer and includes color, graphic matter, or both color and graphic matter visible on the outer surface of the panel.

A mounting system is disposed to affix the panel to the vehicular surface. In one embodiment, the mounting system is a removable magnetic mounting system. In this manner, armor can be installed quickly to deal with an imminent threat. The armor can also be readily removed and reinstalled on the same or another vehicle. A dampening element can be disposed on the panel to minimize transmission of vibrations from the vehicle to the panel. The dampening element can be a compressible material, such as a closed cell foam, disposed about the perimeter of the panel and/or at a center of mass of the panel.

The armor system can be tailored to provide different levels of ballistic projectile protection to the occupants, by, for example, providing a ballistic material of a different thickness or areal density. The threat level protection can be upgraded by providing a stronger panel without dismantling the vehicle's interior.

The armor panel can also be removed and used as a personal shield by including handles on the interior or back side. The panel is relatively light weight for easy handling and installation. As an example, the weight of a typical armor panel for the door of a police patrol car is in the range of 15 pounds.

In one aspect, a vehicular armor system is provided to prevent ballistic projectiles from penetrating a vehicle. The armor system comprises a panel comprising a layered arrangement of materials, the panel comprising an inner surface, an outer surface, and a perimeter defining an area, the area sized to cover at least a portion of an exterior vehicular surface. The panel further comprises a non-planar contour within the perimeter configured to generally conform to a non-planar contour of the portion of the vehicular surface. The layered arrangement of materials includes a protection layer comprised of a ballistic material, the protection layer including an inner side disposed to face the vehicular surface and an outer side disposed to face outwardly from the vehicular surface. The layered arrangement also includes a cosmetic layer arranged on the outer side of the protection layer, the cosmetic layer including color, graphic matter, or both color and graphic matter visible on the outer surface of the panel. A removable mounting system is disposed to affix the panel to the vehicular surface. A dampening element comprising a compressible material is disposed on the inner surface of the panel as an interface with the vehicle and to minimize transmission of vibrations from the vehicle to the panel.

In another aspect, an armor system is provided to prevent ballistic projectiles from penetrating an object to which the armor system is affixed. The armor system comprises a panel comprising a layered arrangement of materials, the panel comprising an inner surface, an outer surface, and a perimeter defining an area, the area sized to cover at least a portion of an exterior surface of the object. The panel further comprises a contour within the perimeter configured to generally conform to a contour of the portion of the surface of the object. The layered arrangement of materials includes a protection layer comprised of a ballistic material, the protection layer including an inner side disposed to face the vehicular surface and an outer side disposed to face outwardly from the vehicular surface. The layered arrangement also includes a cosmetic layer arranged on the outer side of the protection layer, the cosmetic layer including color, graphic matter, or both color and graphic matter visible on the outer surface of the panel. The cosmetic layer is comprised of an automotive grade vinyl material. A mounting system is disposed to affix the panel to the surface of the object.

A method of manufacturing an armor system to prevent ballistic projectiles from penetrating an object having a planar or non-planar contour is also provided. In the method, a layup of sheets of ballistic material is formed. The ballistic material is comprised of a composite material comprising layers of woven or unidirectional fibers in sheet form embedded in a resin matrix. A layer of a polyester film, a thermoplastic film, or a thermoplastic adhesive is provided on each side of the layup. The layup is heated under compression for a sufficient duration until the resin matrix material flows and the layers form a consolidated body, and the consolidated body is cooled. The consolidated body is shaped to form a panel having a desired contour conforming to the contour of the object. A cosmetic layer comprising a layer of automotive wrapping grade of vinyl material is provided. The cosmetic layer printed with color, graphic matter, or both color and graphic matter and is applied the cosmetic layer to one side of the panel. A mounting system is provided to for attaching the panel to the object.

In another aspect of the invention, an armored panel is provided that can be attached to existing surfaces such as doors or walls to prevent ballistic projectiles from penetrating the surface. In one embodiment, an armored door panel is affixed to the surface of a door facing in toward a room to be protected.

In one embodiment, the door panel comprises a planar device having a layered arrangement and sized to cover all or substantially all of an existing door. The planar device includes a protection layer comprised of a ballistic material, the protection layer including an inner side facing the door and an outer side facing outwardly from the door. An outer surface layer is disposed on the outer side of the protection layer. The planar device is affixed to the door with an affixation element such as adhesive or mechanical fasteners.

The outer surface layer can include a dry erase markable or whiteboard surface. In one embodiment, the whiteboard surface can be comprised of a film, or two or more layers of films, of poly(ethylene terephthalate) (PET). In other embodiments, the outer surface layer can comprise a ceramic material, a glass material, an enamel material, a porcelain material, a melamine material, or a painted surface.

The ballistic protection layer is comprised of a composite material of fibers embedded in a matrix. The fibers can be in the form of fabric sheets of woven or unidirectional fibers. The stacked sheets can be arranged in any suitable orientation of the fibers, such as unidirectional sheets alternating 0°, 90°, etc. The particular material(s) for the ballistic protection layer, the number of laminations, the areal density, and the thickness of the ballistic protection layer can be selected, configured, and sized to prevent penetration by a particular threat level, such as a hand gun, shot gun, or an assault rifle, or a threat level of the National Institute of Justice, such as level IIIA or III, or a STANAG performance level.

DESCRIPTION OF THE DRAWINGS

The invention will be more fully understood from the following detailed description taken in conjunction with the accompanying drawings in which:

FIG. 1 is a front view of an armored door panel on a door according to the present invention;

FIG. 2 is an exploded side view of the door and panel of FIG. 1; and

FIG. 10 is a cross-sectional view of the vehicular armor system taken along line X-X of FIG. 7;

FIG. 11 is a side view illustrating a magnetic mounting element attached to a panel;

DETAILED DESCRIPTION OF THE INVENTION

This application is related to U.S. patent application Ser. No. 14/208,092, filed on Mar. 13, 2014, U.S. Provisional Patent Application No. 61/753,177, filed on Jan. 16, 2013, U.S. Design Pat. application No. 29/446,050, filed on Feb. 20, 2013, U.S. Design Pat. Application No. 29/446,070, filed on Feb. 20, 2013, and U.S. Design Pat. application No. 29/446,073, filed on Feb. 20, 2013, the disclosures of all of which are incorporated by reference herein.

This application claims the benefit under 35 U.S.C. §120 of U.S. patent application Ser. No. 14/208,092, filed on Mar. 13, 2014, which claims the benefit under 35 U.S.C. §119(e) of U.S. Provisional Patent Application No. 61/787,495, filed on Mar. 15, 2013, the disclosures of which are incorporated by reference herein.

Figure 3:
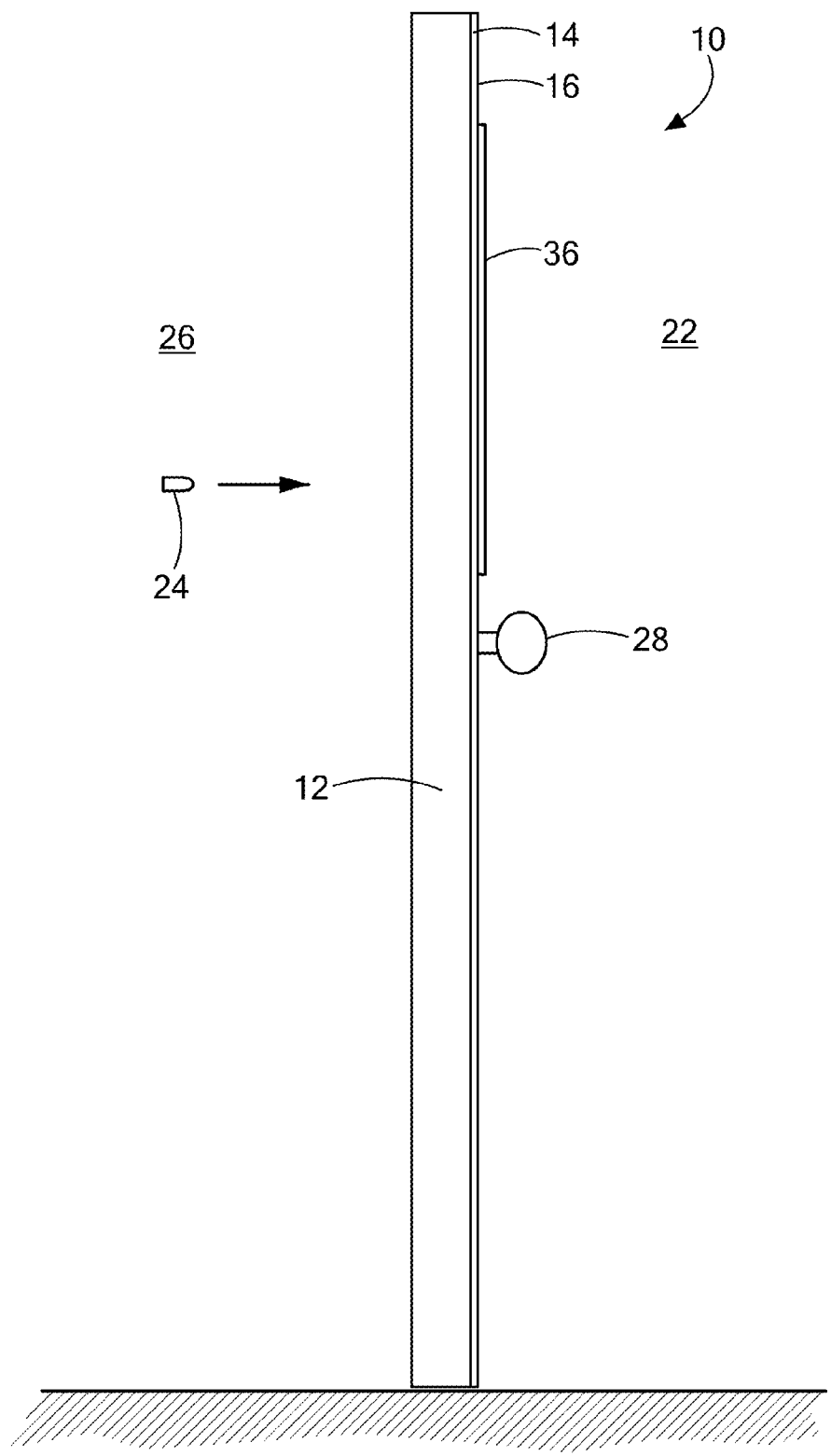
FIG. 3 is a partial side view of the panel of FIG. 1.

An embodiment of an armored door panel 10 affixed to a surface of a door 12 is illustrated in FIGS. 1-3. The door panel includes a ballistic protection layer 14 and an outer surface layer 16. The door panel 10 is affixed to the surface of the door 12 facing toward the room 22 to be protected. In this manner, the door panel prevents projectiles 24 fired at the door from a location 26 outside of the room from penetrating into the room. The outer surface layer 16 of the door panel 10 faces outwardly toward the room 22 and provides a surface that is more visually attractive than the ballistic protection layer 14 and can incorporate other features, such as a markable whiteboard surface, a corkboard, or a bulletin board.

The door panel has a generally rectangular shape and can be sized to cover the entire door or a substantial part of the door. For example, the door panel can cover the door from 18 inches above the floor to the top of the door. The door panel can include one or more apertures 18 for door features such as a doorknob or handle 28. Similarly, the door panel can be configured to avoid a door assist device, which if present is often mounted at the top of the door.

The ballistic protection layer 14, which may also be referred to as a catcher layer, can be comprised of a composite material of fibers embedded in a matrix. The fibers can be in the form of fabric sheets of woven or unidirectional fibers.

The stacked sheets can be arranged in any suitable orientation of the fibers, such as unidirectional sheets alternating 0°, 90°, etc. The sheets can be stacked and laminated together along with the material(s) forming the outer surface layer.

In one embodiment, the ballistic protection layer 14 is comprised of an ultra high molecular weight polyethylene fiber material in a high binding resin, such as a urethane resin. One commercially available suitable material is DYNEEMA® HB-26. SPECTRA® material is another commercially available material that may be suitable. Other suitable materials for the ballistic protection layer include composite materials based on fibers of fiberglass, KEVLAR®, aramid, Twaron, S-glass, nylon, or carbon. Combinations of fibers can also be used. Resins can be thermoset or thermoplastic resins.

The particular material(s) for the ballistic protection layer 14, the number of laminations, the areal density, and the thickness of the ballistic protection layer can be selected, configured, and sized to prevent penetration by a particular threat level, such as a hand gun, shot gun, or an assault rifle, or a particular National Institute of Justice threat level or a STANAG performance level. For example, a ballistic protection layer of DYNEEMA® HB-26 material, laminated under heat and pressure, having a thickness of 0.20 inch and an areal density of 1.0 $lb/ft^2$ (4900 $g/m^2$) is sufficient to meet the National Institute of Justice Threat Level IIIA. A greater thickness and/or areal density would provide greater protection. The National Institute of Justice publication "Ballistic Resistance of Body Armor NIJ Standard-0101.06," available on the National Institute of Justice website www.ojp.usdoj.gov/nij is incorporated by reference herein.

The outer surface layer 16 can be formed from a variety of substrate materials. The substrate material(s) can be affixed to the ballistic protection layer 14 in any suitable manner, for example and without limitation, with an adhesive layer. In one embodiment, the outer surface layer includes a dry erase markable or whiteboard surface comprised of a film, or two or more layers of films, of poly(ethylene terephthalate) (PET). The PET film can be opaque or transparent. Opaque films are typically white, as markings in black marker are easily visible on a white surface. However, films in other colors and films with permanent designs printed thereon can be used. Typically, an opaque film is covered with a transparent film. It will be appreciated that the term "whiteboard" includes surfaces having other colors besides white and/or designs.

Ceramic, glass, enamel, or porcelain surfaces can also be used for the markable surface substrate. These materials are particularly notable for not absorbing dry erase or permanent markers. In one embodiment, a ceramic or glass can be fired onto a steel layer. The markable surface substrate can also be comprised of a high gloss paint layer on a suitable intermediate layer, such as a metal layer. A melamine layer can also be used for the markable surface substrate.

The outer surface 16 layer can also include an intermediate layer, the intermediate layer being then affixed to the ballistic protection layer. The intermediate layer can provide additional structural support and/or ballistic protection. Suitable materials for the intermediate layer include metals, such as steel or aluminum. A steel intermediate layer is also useful for providing magnetic properties, which allows magnets to stick to the whiteboard or other outer surface.

If the door to be protected includes a window 32, a window opening 34 and a window cover 36 can be provided in the panel 10. The cover 36 can be formed of the same ballistic protection layer as the door panel. An outer surface layer 16' can be provided on both sides of the ballistic protection layer. The window cover can be attached via one or more hinges 38 at the side of the window opening 34 and it can be swung over the window 32 when it is desired to cover the window. The cover 36 can be fastened in the covered position over the window opening with any suitable latch or closure mechanism 42, such as and without limitation, a magnet, mechanical fixture, or hook and loop fasteners. The cover can be held in the uncovered position, for example and without limitation, with a magnet, mechanical fixture, or hook and loop fasteners that can be readily disengaged when it is desired to cover the window with the cover.

Figure 5:
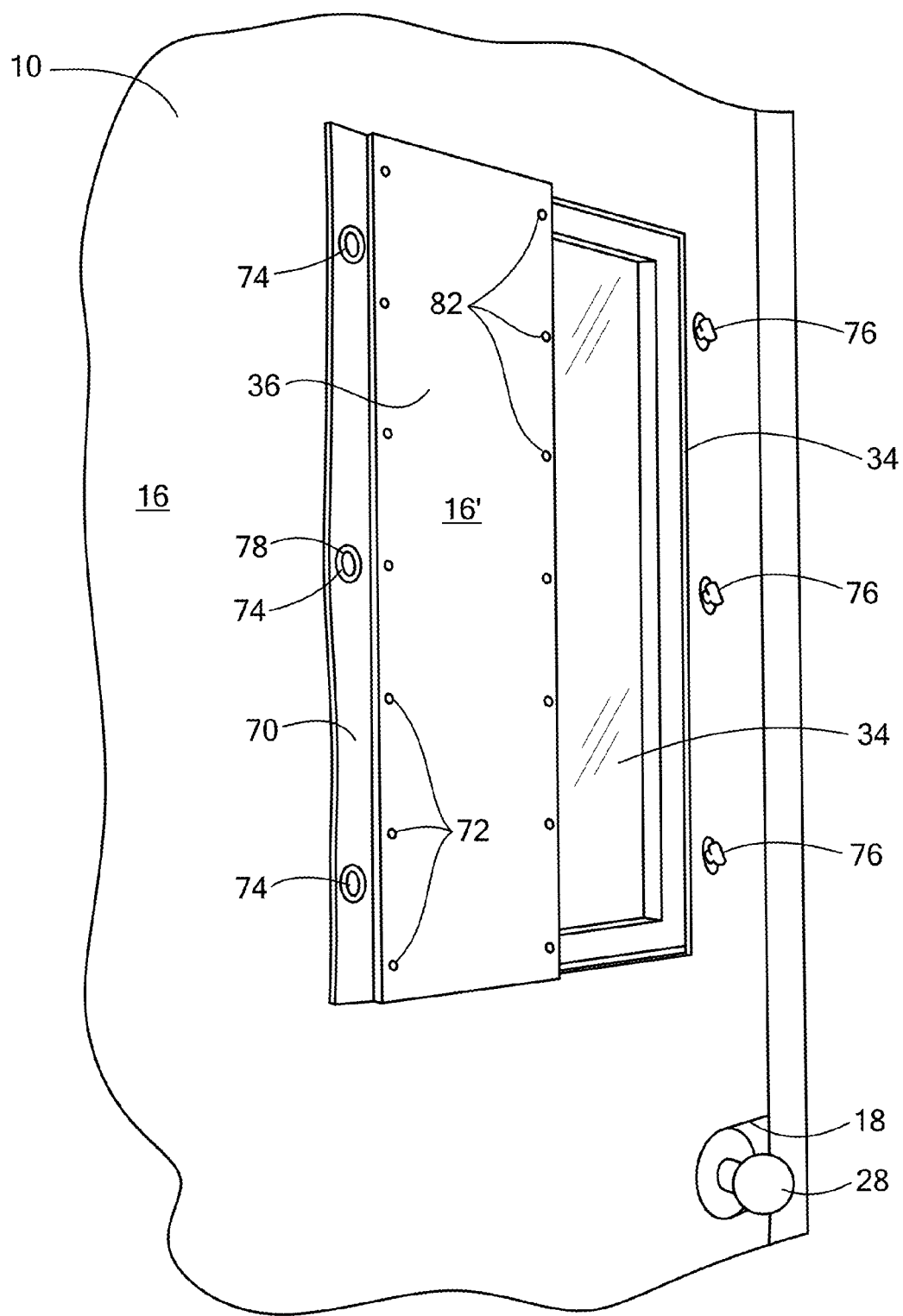
FIG. 5 is a partial view of a window cover of a door panel in an open position.
Figure 6:
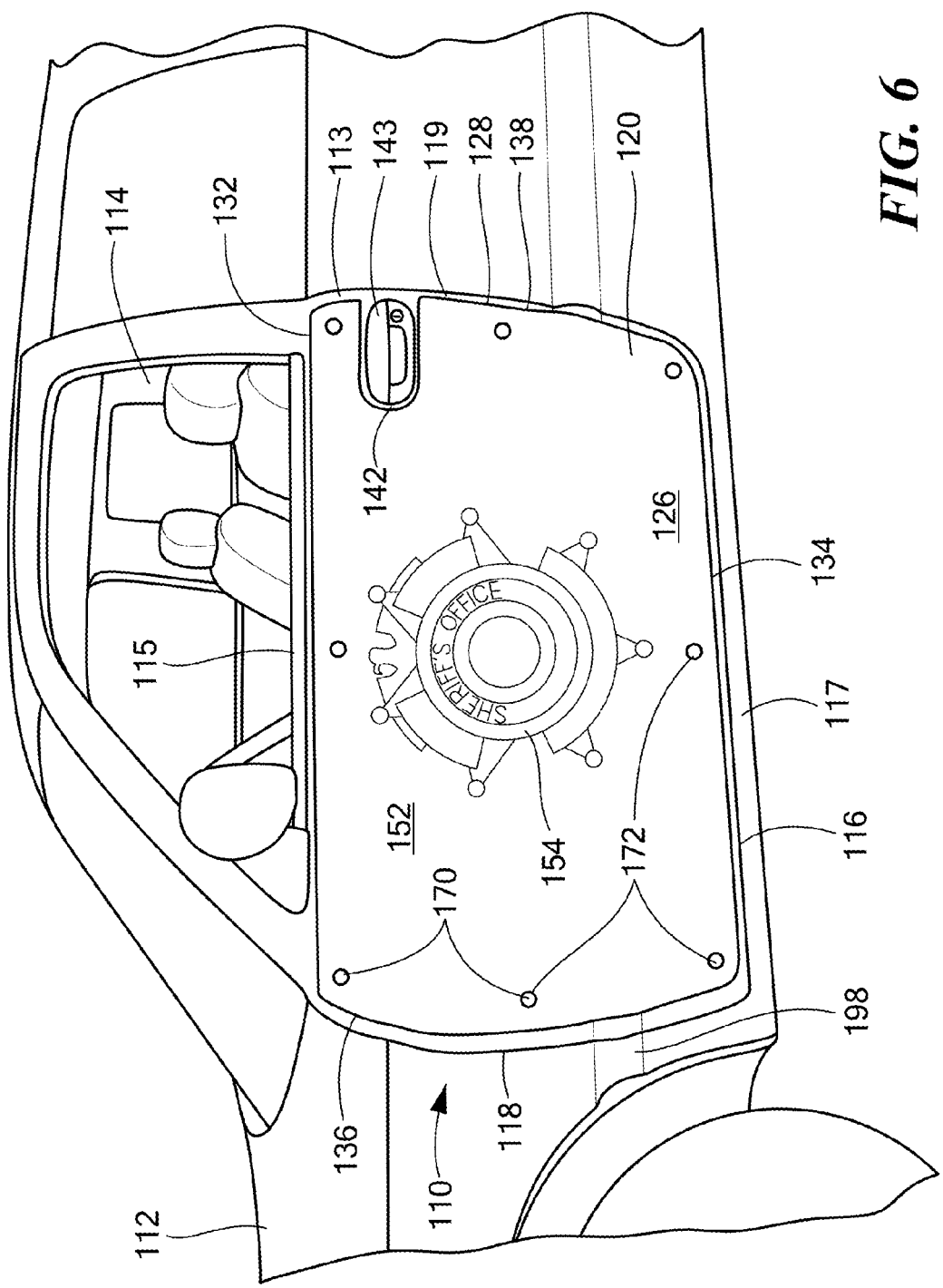
FIG. 6 is a side view of an embodiment of a vehicular armor system attached to a door of a vehicle.
Figure 7:
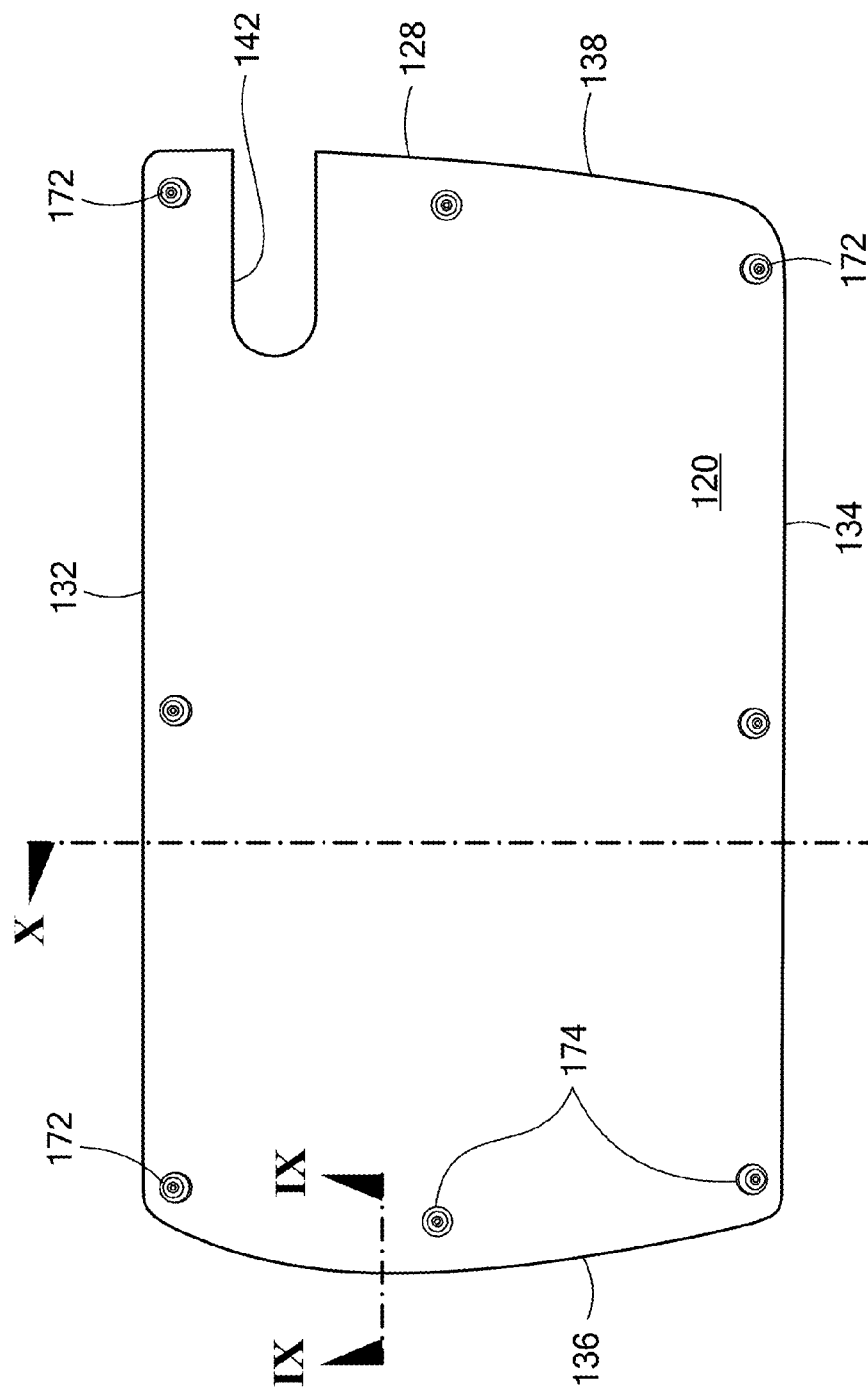
FIG. 7 is front view of the vehicular armor system of FIG. 6.
Figure 8:
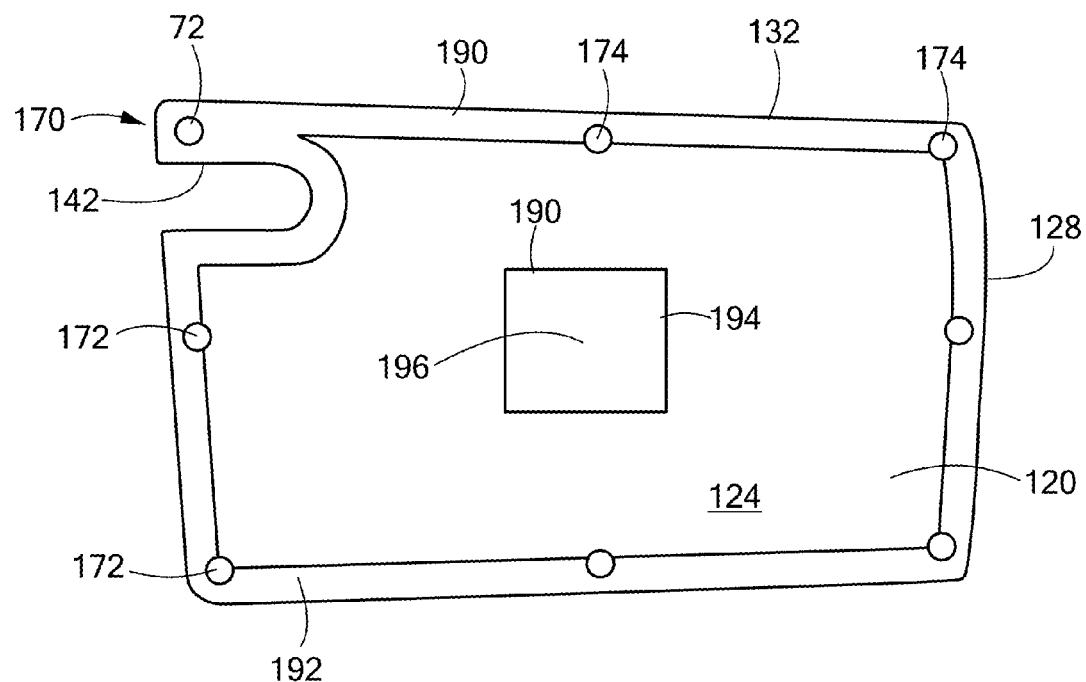
FIG. 8 is a rear view of the vehicular armor system.

In one embodiment, a closure mechanism includes a strip of webbing 70 attached with rivets 72 or the like along a vertical edge of the window cover 36. See FIG. 5. The webbing extends beyond the window cover and includes a number of oval openings 74 through the extension, the openings protected by grommets. A turn button or twist lock type fastener 76 corresponding to each opening is attached to the panel 10 on the opposite side of the window opening 32. Three openings and three fasteners are shown, although any suitable number can be provided. When the cover is closed over the window opening, the turn buttons 76 fit through the openings 74 in one orientation and are twisted 90° to stay in place, thereby holding the window covering closed. One or more turn button or twist lock type fasteners 78 can also be mounted to the panel to hold the cover in the open position; generally, a single such fastener suffices for this position. In one embodiment, a hinge is also formed by a strip of webbing attached with rivets 82 or the like along a vertical edge of the window cover 36 and the window opening 32. The webbing is flexible and allows the window cover to move from an open position to a closed position over the window opening.

An edging or border can be formed around the entire periphery of the protection layer and the outer surface layer. The border protects the edges of the layers from damage and protects a user from sharp edges, particularly of the ballistic protection layer. The edging material can be any suitable material, such as a vinyl material. Edging can be included around the window opening and the window cover, particularly if this is included around the panel.

Figure 4:
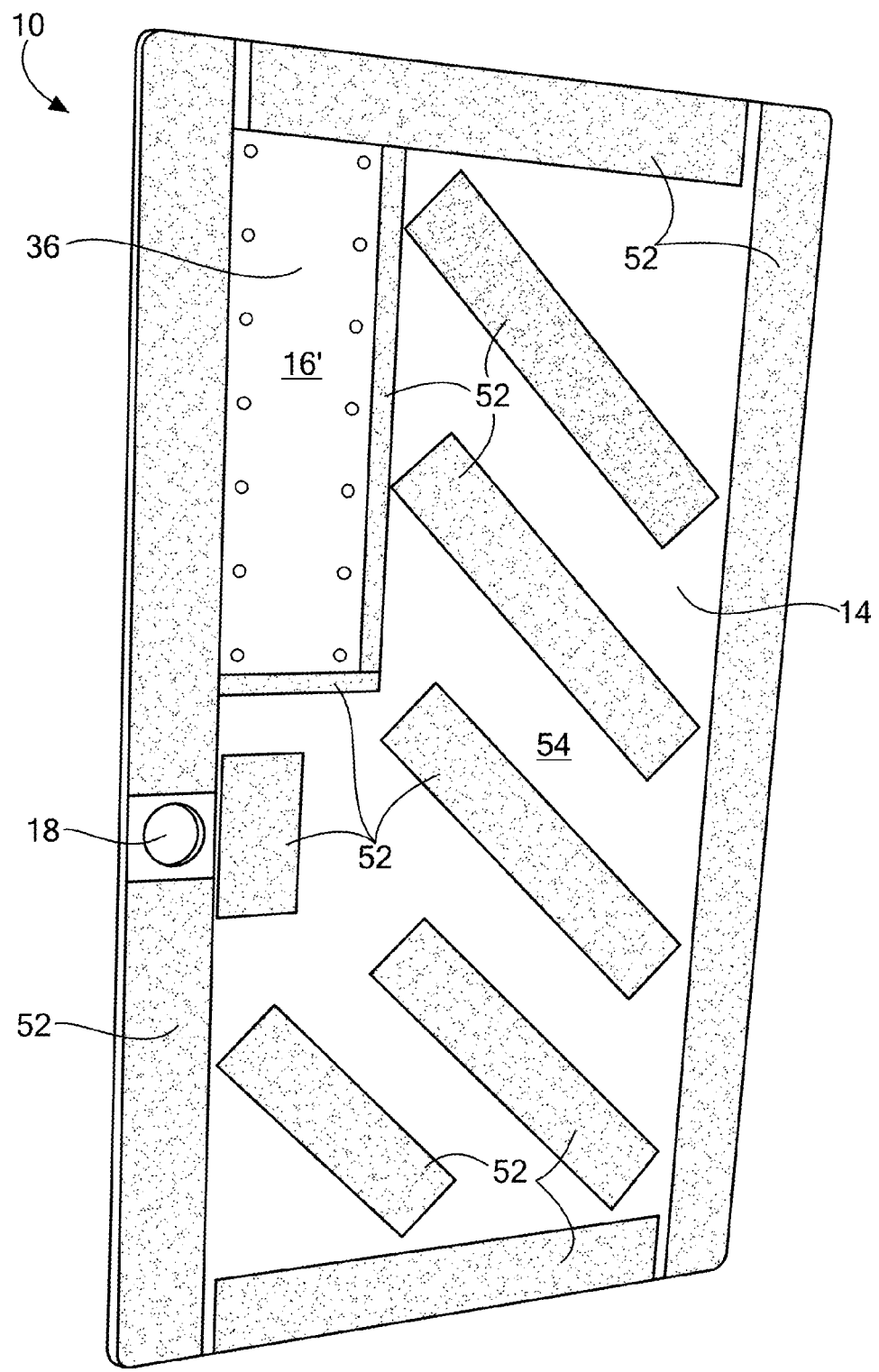
FIG. 4 is a view of an inner side of a door panel.

The door panel 10 can be affixed to the door surface in any suitable manner, such as, without limitation, an adhesive, which can be permanent or removable, or mechanical fasteners such as screws, bolts, rivets or clips. In one embodiment, a high strength acrylic adhesive in the form of a double-sided tape 52 is used, such as a VHB™ tape commercially available from 3M™. One side of the tape is applied to the inner side 54 of the panel 10, leaving the other side of the tape covered with a removable paper or film liner. The tape can be placed over a partial area of the inner side of the panel or over the entire surface area of the inner side of the panel. In one embodiment, edge areas of the door panel are substantially fully covered with tape, and regions within the edge areas are partially covered with tape, as illustrated in FIG. 4. The panel can be shipped in this state. When the panel is to be applied to a door, the paper liner is removed from the adhesive tape. The panel is positioned on the door and pressed into place.

In some cases, the door surface should first be cleaned, for example, with one or more of water, isopropyl alcohol, or a solvent for grease and oil. The door surface can be coated with an adhesion promoting primer to ensure better adhesion if necessary. A door made of a porous or fibrous material, such as wood, may benefit from painting to provide a more unified surface. The door surface can also be abraded to increase the surface area available for adhesion.

The door panel 10 including the ballistic protection layer 14 and the outer layer 16 can be manufactured in any suitable manner. In one embodiment, the ballistic protection layer, for example, layers of DYNEEMA® fabric, an adhesive layer and one or more PET layers are laid up in a press. Heat and pressure are applied to melt the adhesive, and the lamination is then cooled. An acrylic adhesive can be used. In one embodiment, a low melt thermoplastic adhesive can be used that, after the initial application of heat and cooling, converts to a thermoset material. NOLAX® adhesive is a suitable adhesive of this type.

Circuitry can be embedded in the armored door panel to facilitate various electronic functions. For example, the panel can incorporate electronic features to enable Wi-Fi or other wireless or wired communication. If a projectile penetrates the panel, for example, breaking a circuit, a Wi-Fi enabled panel can transmit a signal to a network to so indicate and to provide data identifying the door's location. Circuitry can be included so that the panel can also incorporate an emergency call-for-help device. The call feature can be automated, so that an emergency call is transmitted if a projectile hits the panel or if the window cover is closed. The device can also incorporate an emergency cord or button.

Figure 9:
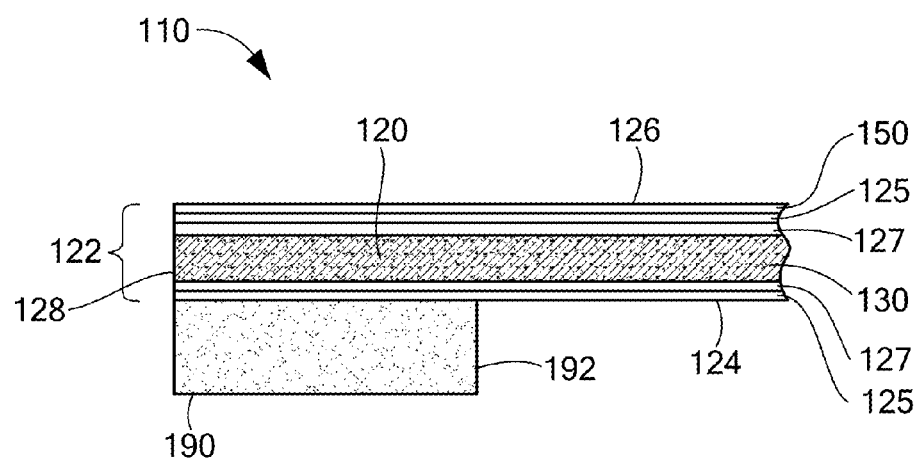
FIG. 9 is a partial cross-sectional view of the vehicular armor system taken along line IX-IX of FIG. 7.
Figure 12:
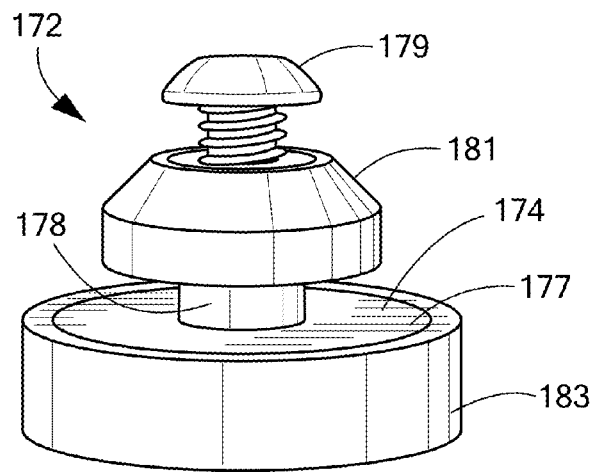
FIG. 12 is a perspective view of the magnetic mounting element of FIG. 11.
Figure 13:
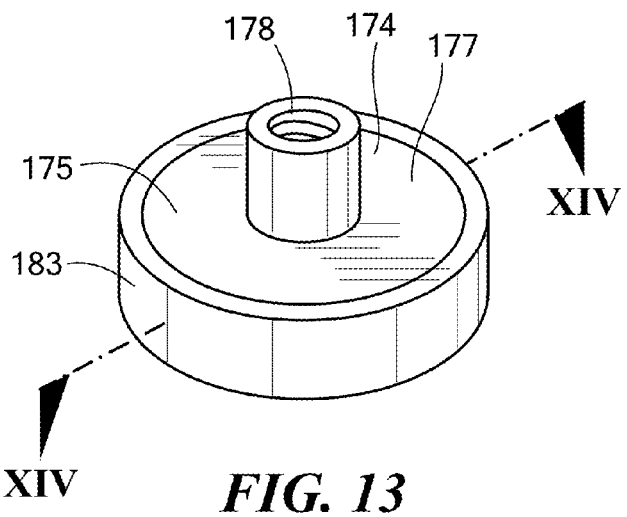
FIG. 13 is a perspective view of the cup magnet of the magnetic mounting element of FIG. 11.
Figure 14:
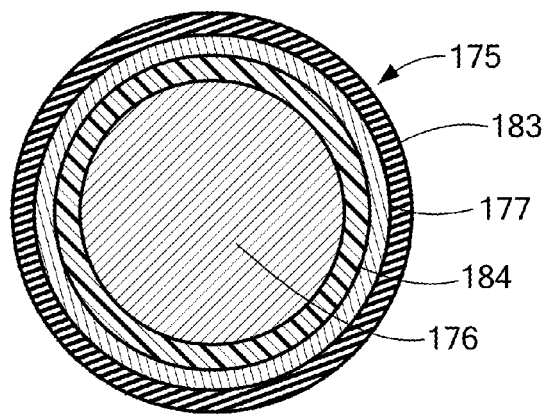
FIG. 14 is a cross-sectional view of the cup magnet of the magnetic mounting element taken line XIV-XIV of FIG. 11.

Referring now to FIGS. 6-10, an embodiment of a vehicular armor system 110 affixed to the exterior of a vehicle 112, such as a law enforcement vehicle, is illustrated. The system is in the form of a panel 120 that covers all or substantially all of the exterior surface area of the vehicle's door 113 below the window 114. The panel includes a protection layer 130 formed of a ballistic material and an outer cosmetic layer 150 (see FIG. 9) on which one or more colors and/or other graphic matter, such as text and images, can be applied, such as by printing. (The layers in FIG. 9 are not to scale and are illustrated schematically for clarity.) The panel is removably affixed to the exterior surface of the vehicle door with a mounting system 170, described further below. When affixed to the vehicle door 113, the panel 120 prevents projectiles fired at the vehicle door from a location outside of the vehicle from penetrating into the interior of the vehicle, thereby providing added protection to an occupant of the vehicle. The outer cosmetic layer 150 of the panel provides a surface 152 that is more visually attractive than the ballistic protection layer. The cosmetic layer can be printed with a color or color pattern over the surface 152 to match the color or color pattern of the vehicle and can incorporate graphic matter 154, such as text and/or one or more images. For example, a logo or symbol to identify a particular law enforcement entity can be printed on the cosmetic layer.

The panel 120 comprises a layered arrangement 122 (FIG. 9) of materials having an inner surface 124, an outer surface 126, and a perimeter 128 that defines an area sized to cover at least a portion of the exterior vehicular surface, such as all or substantially all of the vehicle's passenger door 113. See FIG. 6. The panel comprises a contour within the perimeter that is configured to generally conform to the surface contour of the portion of the vehicular surface. See the cross-sectional view in FIG. 10. For example, many vehicle doors bulge generally outwardly, and the panel can be similarly contoured to conform generally to this bulge.

In the embodiment shown, the perimeter 128 has a configuration that conforms to a perimeter configuration of the vehicle door 113. The perimeter configuration includes an upper edge 132 that extends adjacent or closely adjacent to a bottom edge of a window opening 115 of the door and a lower edge 134 that extends adjacent or closely adjacent to the lower panel 116 of the door above the rocker panel 117. The perimeter configuration also includes side edges 136, 138 that extend adjacent or closely adjacent to the front edge 118 of the door and the rear edge 119 of the door. An aperture or recess 142 is provided in the panel to expose the door handle 143 so that the handle can be accessed by a person desiring to open the door.

The panel includes a dampening element 190 that forms a soft-contact, vibration-resistant interface to the vehicle. Thus, the dampening element serves to minimize vibration of the panel 120 during operation of the vehicle 112. In one embodiment, the dampening element is a standoff border 192 placed around the perimeter 128 on the inner side 124 of the panel. The standoff border is formed of a compressible material, such as an elastomeric foam, which cushions contact between the panel and the vehicle door and minimizes vibration of the panel during vehicle operation. The standoff border can range in thickness from $\frac{1}{8}$ to $\frac{3}{8}$ inch, with $\frac{3}{8}$ inch being generally suitable, although thicknesses outside this range can also suffice. One or more pieces 194 of compressible material may also be placed at island locations within the perimeter, for example, at the center of mass 196 of the panel, to further minimize vibration of the panel during vehicle operation. The standoff border 192 may also compress to allow the panel to fit over smaller protruding features such as a rub rail 198 that may be formed along the vehicles' side, including the door 113. In this manner, the panel can conform generally to the contour of the door, without the need to fit closely over the rub rail.

One suitable foam material is a closed cell foam such as ENSOLITE® IV1, commercially available from Armacell LLC, which is comprised of an acrylonitrile butadiene rubber/polyvinyl chloride/chloroprene material. For example, this foam has a density ranging from 3.0 to 5.0 lb/ft$^3$ and a Shore 00 hardness ranging from 30 to 45. The compressible material can be attached to the inner side in any suitable manner, such as by adhesive bonding with a pressure sensitive adhesive.

Figure 16:
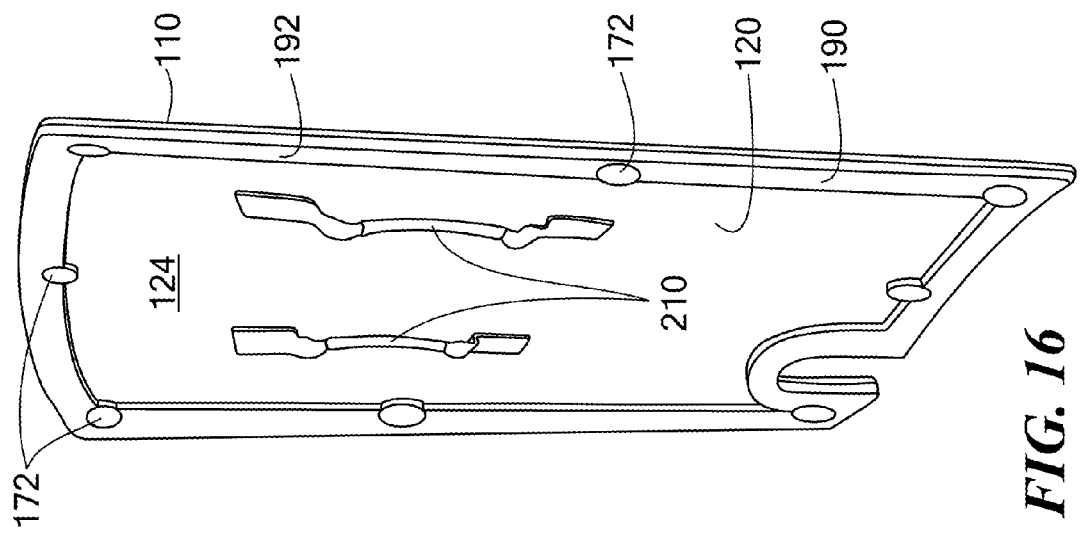
FIG. 16 is a perspective view of an inner side of a vehicular armor system illustrating handles for use as a shield.
Figure 15:
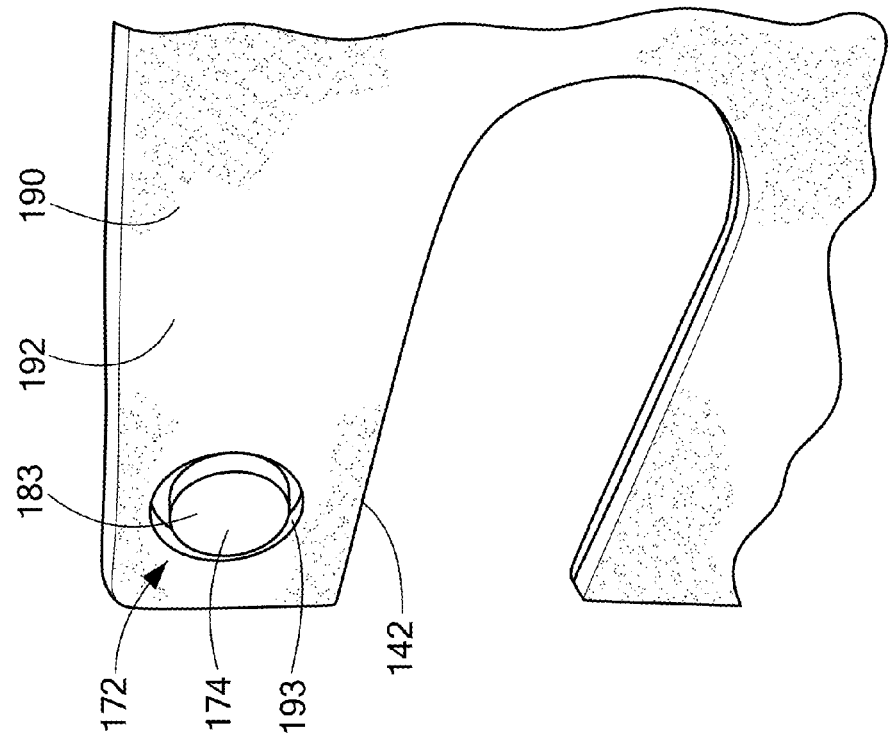
FIG. 15 is a partial view of a damping element with recess for a magnetic mounting element and illustrating an aperture for a door handle.

As noted above, the panel is attached to the vehicle with a mounting system 170 that allows the panel to be easily attached and can also be easily removed if desired. In one embodiment, a magnetic mounting system 172 is provided that attaches magnetically to a vehicle door or other surface made of or incorporating a metal material that is magnetically attractive. The magnetic mounting system includes a plurality of magnetic members 174 that are fastened to the panel at various locations, such as along the perimeter of the panel. For example, in the embodiment illustrated, one magnetic member is located at each corner and one magnetic member is located at an intermediate location along each edge of the panel. Each magnetic member can be located in a recess 193 formed in the standoff border 192. See FIG. 16. Typically, the outer face of the magnetic member is flush or slightly below the surface of the standoff border, so that they do not interfere with the interface between the standoff border and the vehicle. Although eight magnetic members are shown, it will be appreciated that a greater or lesser number of magnetic members may be used, depending on, for example, the size and weight of the panel.

Any suitable magnetic member may be used. In one embodiment, referring to FIGS. 11-14, each magnetic member 174 is a cup magnet 175, in which a disc 176 of magnetic material is placed in a steel cup 177, centered by a spacer 184, to intensify the magnetic field strength and hold and provide protection to the disc of magnetic material. Any suitable magnetic material can be used, such as a neodymium material. In one embodiment, each magnetic member has a pull strength in excess of 100 lbs. and a nominal diameter of 1.5 inch.

The magnetic members are fastened to the panel in any suitable manner. For example, in one embodiment, each cup magnet includes an integral female threaded post 178 extending from a surface of the cup 177. The threaded post extends through an aperture formed in the panel and mates with a screw fastener 179 and washer 181 on the outside of the panel. In this manner, the magnet is retained on the inner surface of the panel. The screw fastener and washer, which are visible on the exterior of the panel, can be selected to blend in as much as possible with the exterior surface of the panel. For example, the screw head can be painted the same background color as the cosmetic layer, or a cover in the same background color can be applied over the screw head. In another example, each magnetic member is bonded to the inner surface of the panel with a suitable adhesive, such as VHB™ acrylic foam tape commercially available from 3M Company. Hook and loop type fasteners can also be used.

A non-slip coating 183 can be formed over the outer exposed surface of the magnetic member to prevent or minimize slippage against the vehicle surface and to protect the vehicle surface from scratching. For example, cup magnets with rubber boot coverings are commercially available form Amazing Magnets. Alternatively, the coating can be applied as a spray on polyurea coating, such as that commercially available from Rhino Linings Corporation.

It will be appreciated that the panel can be attached to the vehicle with other mounting systems, such as with an adhesive or with mechanical fasteners, such as quarter turn fasteners, screws, bolts, or the like. Also, although a removable mounting system is often desirable, the panel can be attached permanently to a vehicle, for example, if it is desired to permanently retrofit a vehicle with ballistic protection rapidly and without disassembly of the vehicle. In one example, the mounting system can include an adhesive layer comprising a high strength acrylic adhesive in the form of a double sided tape. One side of the tape is applied to the inner side of the protection layer, and a release liner is applied to the other side of the tape. The release liner is removed and the panel pressed against the vehicle surface, to which it then adheres.

The ballistic material of the protection layer of the panel can be comprised of a composite material of fibers embedded in a matrix. The fibers can be in the form of fabric sheets of woven or unidirectional fibers. The stacked sheets can be arranged in any suitable orientation of the fibers, such as unidirectional sheets alternating 0°, 90°, 0°, 90°, etc. The sheets can be stacked and laminated together under heat and pressure.

In one embodiment, the ballistic protection layer is comprised of an ultra high molecular weight polyethylene fiber material in a high binding resin matrix, such as a urethane resin. One commercially available suitable material is DYNEEMA® HB-26. SPECTRA® material is another commercially available material that may be suitable. Other suitable materials for the ballistic protection layer include composite materials based on fibers of fiberglass, KEVLAR®, aramid, Twaron, S-glass, nylon, or carbon. Combinations of fibers can also be used. Resins can be thermoset or thermoplastic resins.

The particular material(s) for the ballistic protection layer, the number of laminations, the areal density, and the thickness of the ballistic protection layer can be selected, configured, and sized to prevent penetration by a particular threat level, such as a hand gun, shot gun, or an assault rifle, or a particular National Institute of Justice threat level or a STANAG performance level. Generally, the areal density can range from 0.5 to 5.0 lb/ft$^2$, and the thickness can range from 0.1 to 1.0 inch. For example, a ballistic protection layer of DYNEEMA® HB-26 material, laminated under heat and pressure, having a thickness of 0.20 inch and an areal density of 1.0 lb/ft$^2$ (4900 g/m$^2$) is sufficient to meet the National Institute of Justice Threat Level IIIA. A layer of DYNEEMA® HB-26 material, laminated under heat and pressure, having a thickness of 1.0 inch and an areal density of 1.0 lb/ft$^2$ (4900 g/m$^2$) is sufficient to meet the National Institute of Justice Threat Level III, which may be preferred for doors of law enforcement vehicles. Thus, it will be appreciated that a greater thickness and/or areal density provides greater protection. As noted above, the National Institute of Justice publication "Ballistic Resistance of Body Armor NIJ Standard-0101.06," available on the National Institute of Justice web site www.ojp.usdoj.gov/nij, is incorporated by reference herein.

Each side of the ballistic protection layer is coated with a covering layer 125 of clear polyester film. The film may be bonded to the sides in any suitable manner, such as with a layer of thermoset epoxy adhesive 127. The film covers the rough surfaces of the ballistic material and provides a better surface to which to bond the cosmetic layer and the dampening element. In an alternative, a single layer of thermoplastic film or adhesive, for example, having a thickness of 0.006 inch, can be bonded to the sides of the ballistic protection layer as a covering layer. A suitable thermoplastic film or adhesive is commercially available from Nolax.

To manufacture the panel, sheets of ballistic material, such as DYNEEMA® HB 26, are laid up, for example, in an alternating 0°, 90° fiber orientation. A layer of bonding adhesive, typically a thermoset epoxy, and a layer of polyester film are added to each side, or alternatively a layer of thermoplastic film or adhesive is added to each side. The number of sheets of ballistic material is selected to achieve a desired thickness of the protective layer. The assembly of layers or layup is heated and compressed for a sufficient duration until the resin matrix material flows and the layers form a consolidated body. Generally, the pressure can range from 500 to 4000 psi, the temperature can range from 250 F to 300 F, and the hold time can range from 20 to 120 minutes, depending on the particular materials used and the thickness of the finished part, although values outside these ranges can be used if desired or necessary. In one suitable example, the pressure is 3000 psi, the temperature is 265 F, and the duration is 30 minutes. The consolidated body is then cooled, and the pressure removed when sufficient cooling has occurred to allow the layers to remain well laminated together.

The consolidated body is cut to the configuration of the particular vehicle door or other surface to be covered. Apertures for receiving the threaded posts 178 of each magnetic member are machined in the body. In an alternative, recessed holes for each magnetic member are machined into the inner side of the consolidated body leaving intact some layers of the ballistic material and the outer polyester or thermoplastic layer, if the magnetic members are to be recessed into the panel.

The consolidated body is shaped to form a panel having a desired contour. In one embodiment, the consolidated body is warmed to a suitable temperature, for example, 150 F to 350 F, and press formed in a mold at a suitable pressure, for example, 5 to 100 psi, to form the contour. In one suitable example, the pressure is 10 psi and the temperature is 260 F. The contour can be determined by digitizing the surface of the vehicle using a coordinate measuring device or from CAD data obtained from the vehicle manufacturer. The contour data are input to a suitable CAM (computer aided manufacturing) program that interfaces with a CNC (computer numerical control) machine to produce the mold.

The outer cosmetic layer 150 is suitably comprised of a layer of automotive wrapping grade of vinyl material. The vinyl material generally has a thickness ranging from 0.0005 to 0.005 inch, with a thickness of 0.004 being suitable in one example. Automotive wrapping grade vinyl can be obtained from various sources, such as 3M Company, General Formulations, or Avery Dennison.

A background color or color pattern that matches the color or color pattern of the vehicle can be applied to the layer of vinyl material, so that the panel blends in visually with the vehicle. Additionally, any graphic design desired by the vehicle owner can be applied to the vinyl material layer. Processes for printing graphics and colors onto automotive vinyl are well known, and any suitable process can be used. Typically, a graphic design program such as Adobe Illustrator is used to create a graphic design. The graphic design is communicated to a suitable printer, such as a UV (ultraviolet) printer, that can print a standard vector image from the graphic design program onto large area sheets. Vinyl material can also be obtained from the manufacturer in pre-selected colors.

The cosmetic layer with printed matter, if any, is then attached to the consolidated and shaped panel in any suitable manner. For example, many automotive vinyls are sold commercially with a layer of pressure sensitive adhesive attached on one side, covered by a peelable release liner. The release liner is removed, and the cosmetic layer is pressed into place on the outer surface of the consolidated body, removing air bubbles as necessary. The pressure sensitive adhesive can be repositionable or permanent. The cosmetic layer can wrap around the edges and onto the inner side of the panel, which provides additional protection from the elements, such as water, salt, or abrasion. Alternatively, the edges can be trimmed to fit the area of the outer surface of the consolidated body if it overhangs the edges. The cosmetic layer of automotive vinyl also provides good ultraviolet protection for the panel. The cosmetic layer can also be removable, for example, if it is desired to change or replace the graphic matter.

The dampening elements and the magnetic elements of the mounting system are then attached to the panel, as described above.

Figure 18:
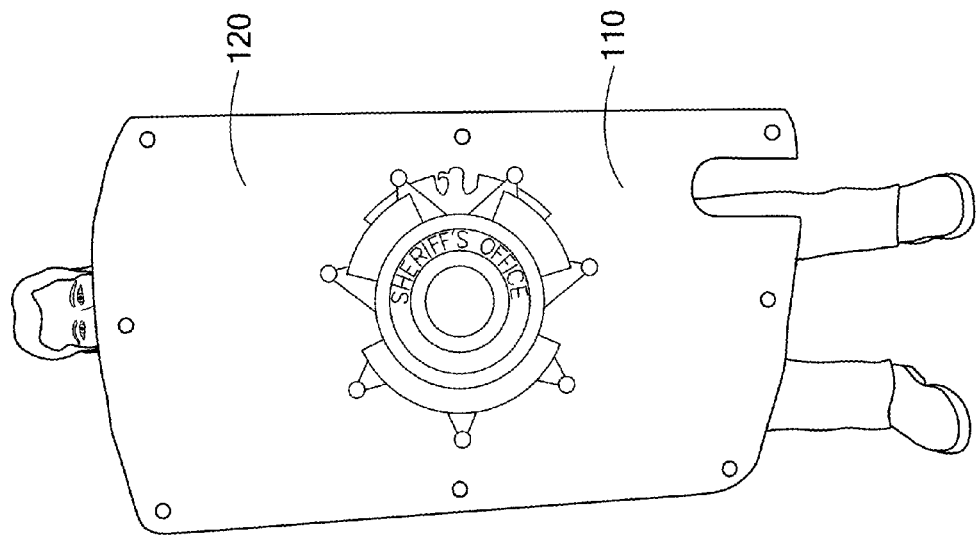
FIG. 18 is a front view of a user holding the vehicular armor system as a shield.
Figure 17:
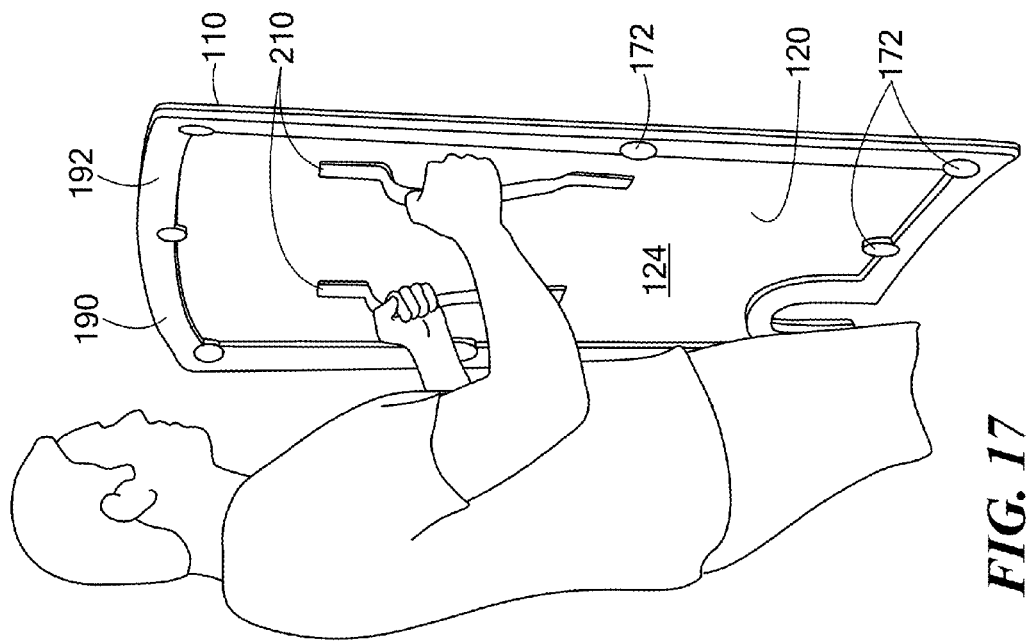
FIG. 17 is a perspective view of a user holding the vehicular armor system as a shield.

The panel 120 can also include one or more handles 210 on the inner surface 124. The handles allow a user to carry the panel 120 and also to use the panel as a personal shield if necessary. See FIGS. 17-18. Preferably two handles are provided, although one large handle or more than two handles in various locations could be provided if desired. The handles 210 can be formed of any suitable material, such as webbing or a rubber material, that is fastened to the inner surface in any suitable manner, such as with a bonding adhesive or mechanical fasteners. The handles can be somewhat flexible to compress to fit within the space defined by the standoff border 192 provided by the dampening element when the panel is attached to a vehicle.

The entire panel is relatively lightweight, and can be handled and used as a personal shield by a single person. See FIGS. 17-18. For example, a typical panel for a police patrol car weighs approximately 15 pounds. The ballistic material in the protection layer is approximately 0.2 inch thick and weighs approximately 10 pounds. The magnetic mounting system employing eight cup magnets as described above weighs approximately 5 pounds. The weight of the cosmetic layer and dampening elements are negligible compared to the weight of the ballistic material and the magnets.

Accordingly, the vehicular armor system provides a number of advantages. The system can be installed rapidly on a vehicle exterior, in a matter of seconds or minutes, rather than hours or days as required for other armor systems, and without requiring dismantling of the vehicle. Installation can be done quickly in response to imminent threats. The panel can be removed and used as a personal shield by including handles on the inner or back side.

The armor system can include a cosmetic layer that is colored to blend in with the vehicle itself and therefore to be less conspicuous. Graphics, such as text and/or images, can be applied to the cosmetic layer, for example, to identify a law enforcement entity.

The vehicular armor system can be tailored to provide different levels of ballistic projectile protection to the occupants, for example, by using ballistic material of varying thickness and/or density. The threat level protection can be upgraded by changing one panel for another panel with greater protection. The vehicular armor system can also be applied to objects other than vehicles, such as doors, walls, desks, columns, and other structural elements or facades. Such objects can have a planar or a non-planar contour. Alternative or additional edge treatments can be applied to the perimeter.

It will also be appreciated that the various features described herein can be combined with each other in various ways. For example, the handles 210 can be applied to the panel that also includes the dampening element located at an island location within the perimeter of the panel.

The invention is not to be limited by what has been particularly shown and described, except as indicated by the appended claims.

What is claimed is:

1. An armor system to prevent ballistic projectiles from penetrating a vehicle door having an exterior surface to which the armor system is affixed, the exterior surface located below a window in the vehicle door, the exterior surface having a non-planar contour including an outward bulge, the armor system comprising:
   a panel comprising a layered arrangement of materials, the panel comprising an inner surface, an outer surface, and a perimeter defining an area, the area sized to cover at least a portion of an exterior surface of the door of the vehicle to provide protection to an occupant of the vehicle adjacent the vehicle door, the panel further comprising a non-planar contour including an outward bulge within the perimeter configured to generally conform to the non-planar contour of the exterior surface of the vehicle door, the layered arrangement of materials comprising:
      a protection layer comprised of a ballistic material, the protection layer including an inner side disposed to face the exterior surface of the vehicle door and an outer side disposed to face outwardly from the exterior surface of the vehicle door, and
      a cosmetic layer arranged on the outer side of the protection layer, the cosmetic layer including color, graphic matter, or both color and graphic matter visible on the outer surface of the panel; and
   a mounting system disposed to affix the panel to the exterior surface of the vehicle door.

2. The system of claim 1, wherein the mounting system comprises a removable magnetic mounting system, a mechanical fastener system, or an adhesive bonding system.

3. The system of claim 1, further comprising a dampening element comprising a compressible material disposed on the inner surface of the panel as an interface with the object and to minimize transmission of vibrations from the object to the panel.

4. The system of claim 1, wherein the protection layer is comprised of a composite material comprising layers of woven or unidirectional fibers embedded in a urethane matrix, the fibers comprised of a high molecular weight polyethylene, the protection layer having a thickness between 0.1 and 1.0 inch.

5. The system of claim 1, wherein the protection layer further comprises a covering layer comprised of a polyester film, a thermoplastic film, or a thermoplastic adhesive bonded to each of the inner side and the outer side of the protection layer.

6. The system of claim 1, further comprising one or more handles disposed on the inner surface of the panel, the one or more handles configured to be gripped by a hand or hands of a user to carry the panel or to use the panel as a shield.

7. The system of claim 1, wherein the area of the panel is sized and configured to cover all or substantially all of the door of the vehicle.

8. The system of claim 7, further comprising an aperture formed in the panel configured to expose a door handle of the vehicle.

9. The system of claim 1, wherein the ballistic material of the protection layer has a thickness and areal density selected to provide protection against at least a National Institute of Justice threat level IIIA or at least a National Institute of Justice threat level III.

10. The system of claim 1, wherein the cosmetic layer is comprised of an automotive grade vinyl material on which the color or graphic matter or both is printed, the graphic matter comprising text, an image, or both text and image.

11. The system of claim 1, wherein the cosmetic layer includes both color and graphic matter visible on the outer surface of the panel.

12. The system of claim 1, wherein the cosmetic layer includes graphic matter visible on the outer surface of the panel.

13. The system of claim 1, wherein the mounting system comprises a magnetic mounting system comprising one or more magnetic members affixed to the panel, the magnetic members disposed to contact the exterior vehicular surface.

14. The system of claim 1, wherein the ballistic material of the protection layer has an areal density between 0.5 and 5.0 $lb/ft^2$.

* * * * *